United States Patent [19]

Holmberg, Jr. et al.

[11] Patent Number: 5,018,571
[45] Date of Patent: May 28, 1991

[54] MAGNETIC ROTARY THERMAL JOINT

[75] Inventors: Arthur Holmberg, Jr., Cypress; David E. Wilson, Huntington Beach, both of Calif.

[73] Assignee: Rockwell International Corporation, El Segundo, Calif.

[21] Appl. No.: 360,676

[22] Filed: Jun. 2, 1989

[51] Int. Cl.$^5$ ............................ B64G 1/50; F28F 5/00
[52] U.S. Cl. ........................................ 165/41; 165/86; 165/104.14; 165/185; 244/163
[58] Field of Search ...................... 165/86, 185, 104.14, 165/41; 244/163

[56] References Cited

U.S. PATENT DOCUMENTS 3,965,973  6/1976  Thettu .................................. 165/86
4,345,642  8/1982  Ernst et al. ........................... 165/86

Primary Examiner—Albert W. Davis, Jr.
Attorney, Agent, or Firm—H. Fredrick Hamann; George A. Montanye; David J. Arthur

[57] ABSTRACT

A magnetic rotary thermal joint for operation in deep space, vacuum environments, the joint comprising a first rotor having a first thermal surface; a second rotor having a second thermal surface; bearing means for rotationally coupling the first rotor to the second rotor, each the rotor being free to rotate in fixed coaxial alignment with respect to the other rotor; and magnetic means for providing a thermal path from the first thermal surface to the second thermal surface. Heat is carried to the first rotary thermal joint through a heat pipe and heat is carried away from the second thermal joint with a heat pipe.

14 Claims, 7 Drawing Sheets

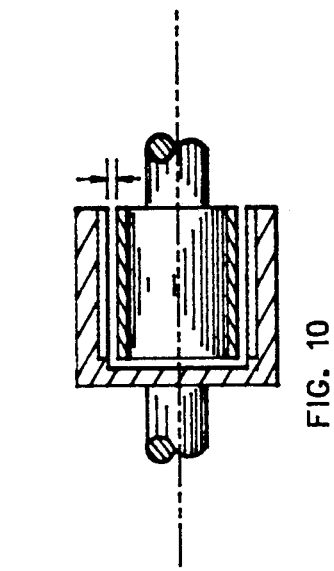
FIG. 10
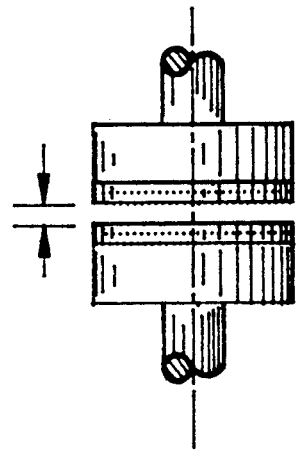
FIG. 6
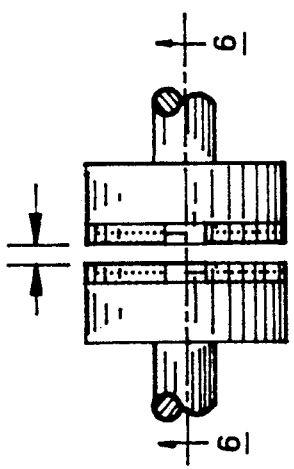
FIG. 7
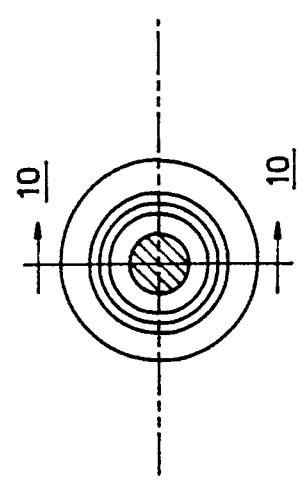
FIG. 8
FIG. 9

5,018,571

MAGNETIC ROTARY THERMAL JOINT

The invention herein described was made in the course of and/or under Contract No. DASG60-C-0095 with the Department of the Army.

BACKGROUND OF THE INVENTION

This invention relates to the field of mechanical rotary couplings and more particularly to the field of mechanical couplings suitable for use in aerospace, military and industrial applications requiring high reliability, low torque, small size, light weight, and a very low thermal gradient across a rotary joint operating in a deep space, vacuum environment.

DESCRIPTION OF PRIOR ART

Rotary joints typically move heat through a rotary joint by connecting the surface of one joint to the surface of another joint through a bearing system, such as ball bearings or sleeve bearings. The thermal gradient for a given heat load across the joint is a function of the available surface areas, the thermal conductivity of the materials, the temperature at which the joint operates and the atmospheric pressure that the joint is required to operate in. Low torque applications typically provide a gap between the rotating surfaces. As the gap is increased, to reduce the torque required to rotate the joint, the thermal gradient across the joint for a given heat load at a given atmospheric pressure is increased.

SUMMARY OF THE INVENTION

This invention characterizes an improved rotary thermal joint for reliably coupling heat through a rotary coupling with a very low thermal gradient for a given heat load. The invention rotary thermal joint uses a magnetic powder as a filler between rotating surfaces. The particles of the powder have a controlled maximum size and the material is selected to have a relative permeability sufficient to ensure alignment of the particles between a first and second rotating surface when subjected to the field of a permanent magnet. Heat is efficiently transferred from the first rotary surface to the second rotary surface via the large number of particles connecting the two surfaces in response to the field of the permanent magnets.

Heat is coupled to the joint and removed from the joint by structural and support elements and by heat pipes where more efficient transfer of heat from one assembly to another is required.

BRIEF DESCRIPTION OF THE DRAWINGS

FIGS. 6-10 are alternative arrangements for the invention thermal joint.

BRIEF DESCRIPTION OF THE PREFERRED EMBODIMENT

Figure 1:
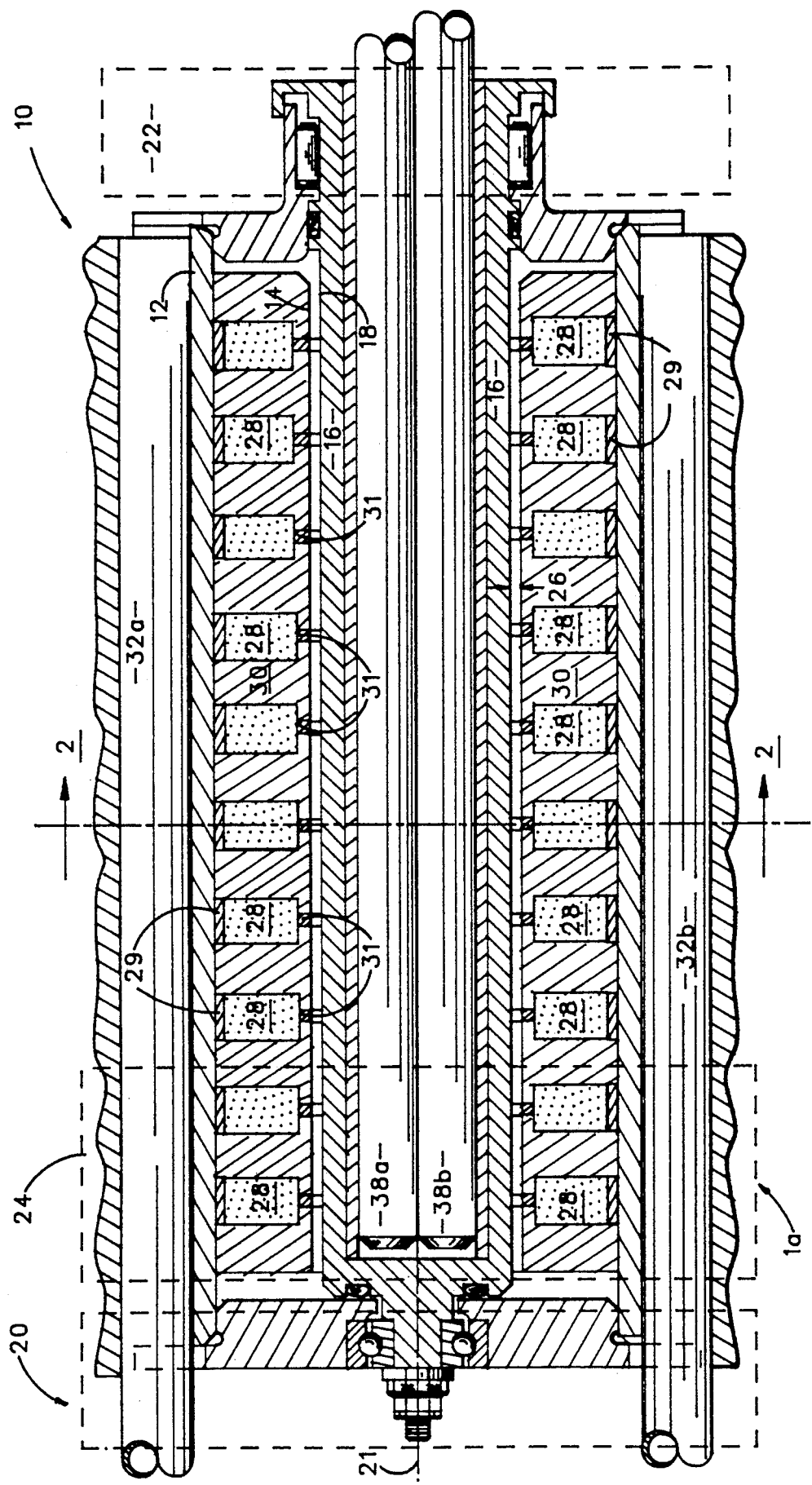
FIG. 1 is a sectional view of a magnetic rotary thermal joint.

FIG. 1 shows the invention magnetic rotary thermal joint 10 in section. First rotor 12 has a first thermal surface 14 and second rotor 16 has a second thermal surface 18. Phantom blocks 20 and 22 represent a bearing means for rotationally coupling the first rotor 12 to the second rotor 16. Each rotor is free to rotate in fixed coaxial alignment, i.e. on axis 21, with respect to the other rotor.

Figure 1A:
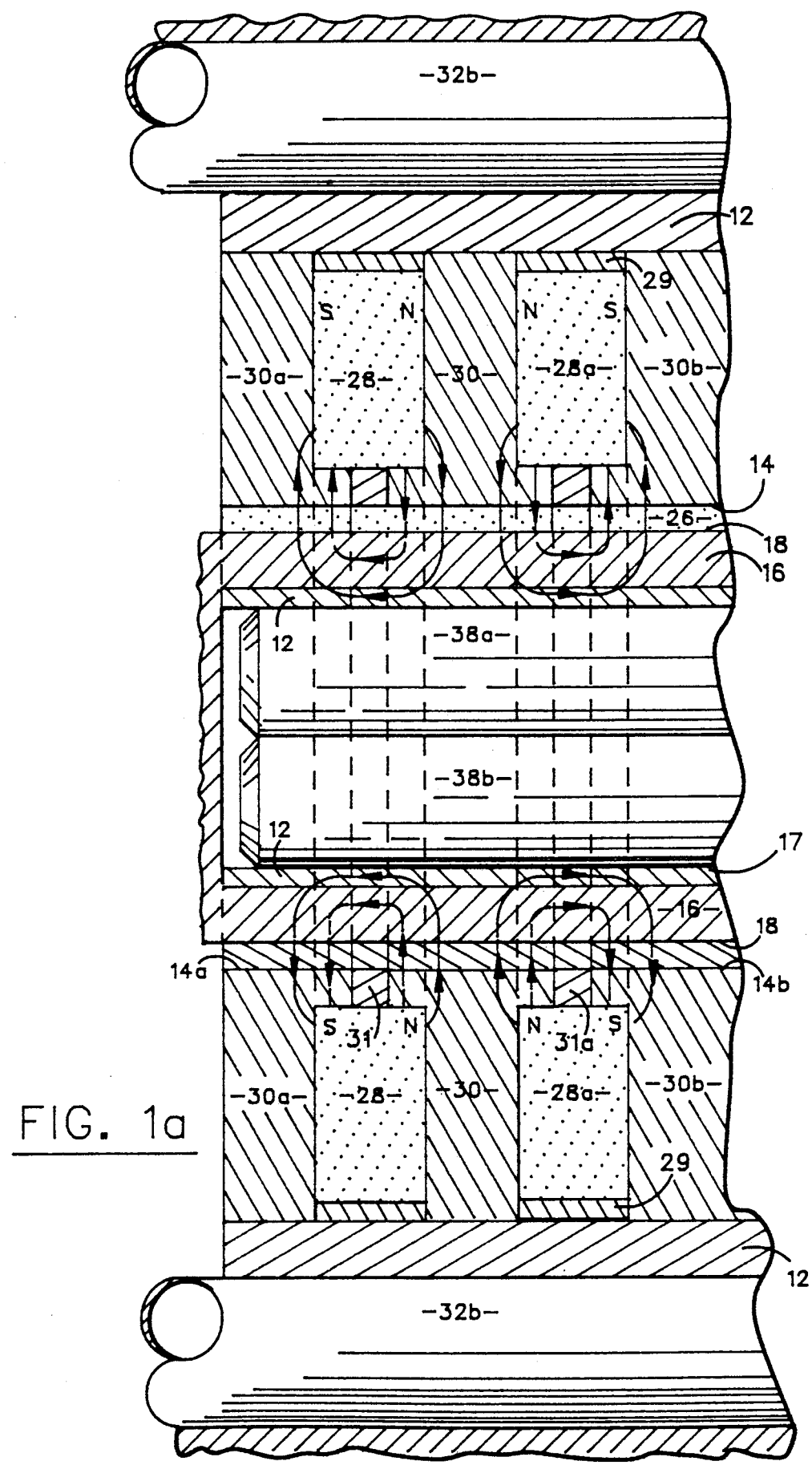
FIGURE 1a is an expanded view of the phantom box 1a in FIGURE 1.
Figure 2:
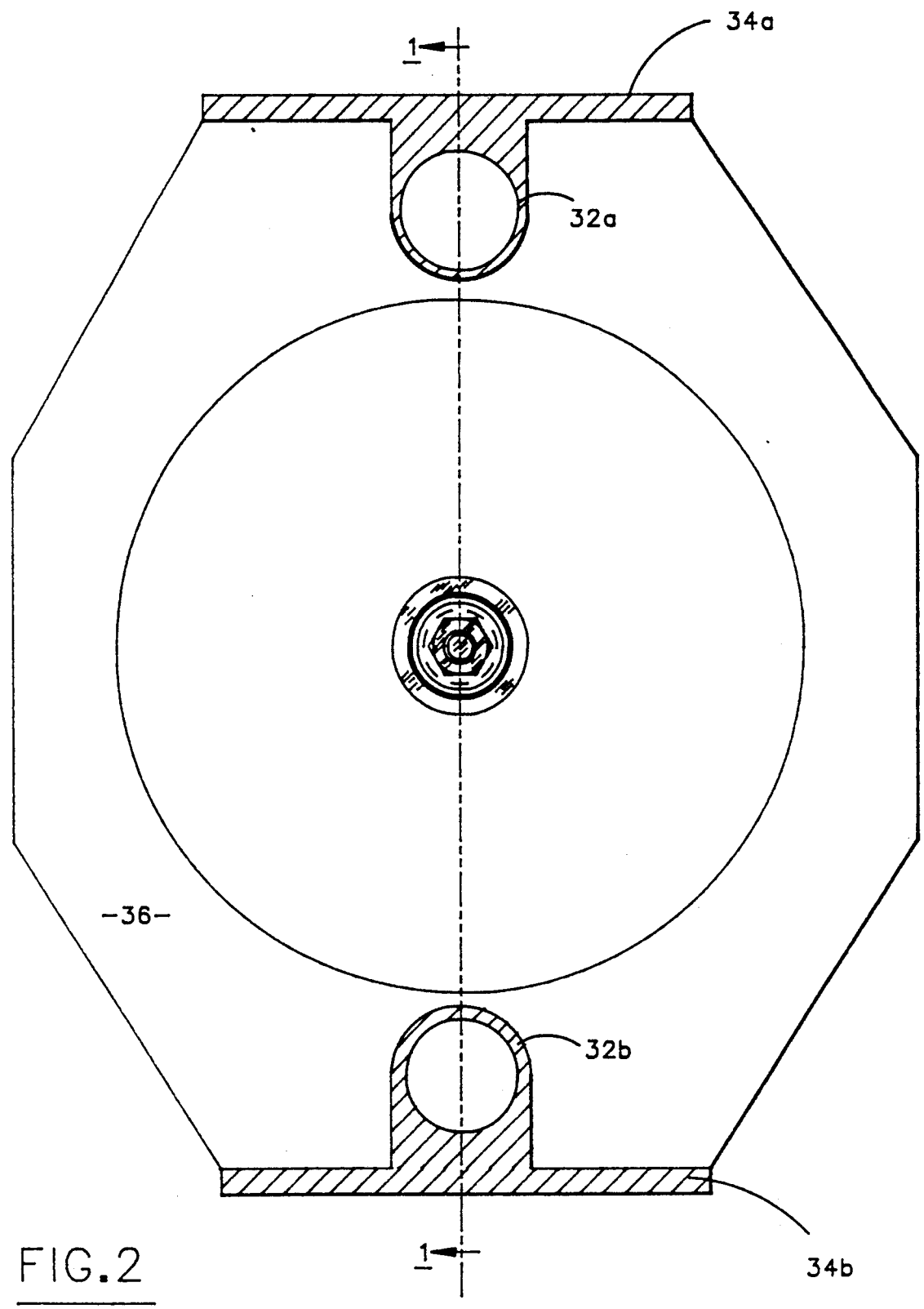
FIG. 2 is an end view of the magnetic rotary thermal joint.

Phantom block 24 is enlarged in FIG. 1a to more clearly show how the invention magnetic rotary thermal joint provides an improved thermal path even in a near vacuum environment. The first and second thermal surfaces 14, 18 respectively, are separated by a fixed predetermined gap 26. A first permanent magnet 28 is coupled to the first thermal surface 14 by lines of magnetic flux that leave the right side of the surface of the toroid 28 designated as a north pole by the letter N. The flux lines are repulsed and deflected by the flux lines emanating from the north pole on the left side of toroid 28a to pass vertically across gap 26.

FIG. 1a shows that the deflected lines of flux diverge to the left and right as they enter the material of second rotor 16 to return across the gap 26 at the left and right to second thermal surfaces 14a and 14b respectively. The flux lines then pass through toroids 30a and 30b to return to the south poles of permanent magnets 28 and 28a respectively.

Toroids 30a, 30 and 30b provide a high permeability magnetic path for guiding lines of flux from the magnetic field across the gap 26 to the poles of permanent magnets 28 and 28a. A thermally conductive ferromagnetic media (not shown) fills the gap between the first thermal surface 14 and the second thermal surface 18.

The thermally conductive ferromagnetic media is typically a ferromagnetic powder of high permeability. The powder has predetermined particle size and fills the gap 26. The magnetic field aligns the particles in the magnetic field. The aligned particles contact each other and thereby thermally couples the first surface 14 to the second surface 18 via the ferromagnetic powder particles.

The combination of permanent magnet 28 and the thermally conductive media in gap 26, and the ferromagnetic material of second rotor 16 represent a magnetic means for providing a thermal path from the first thermal surface 14 to the second thermal surface 18. Toroids 30a, 30, 30b contribute to an improved flux path.

Figure 3:
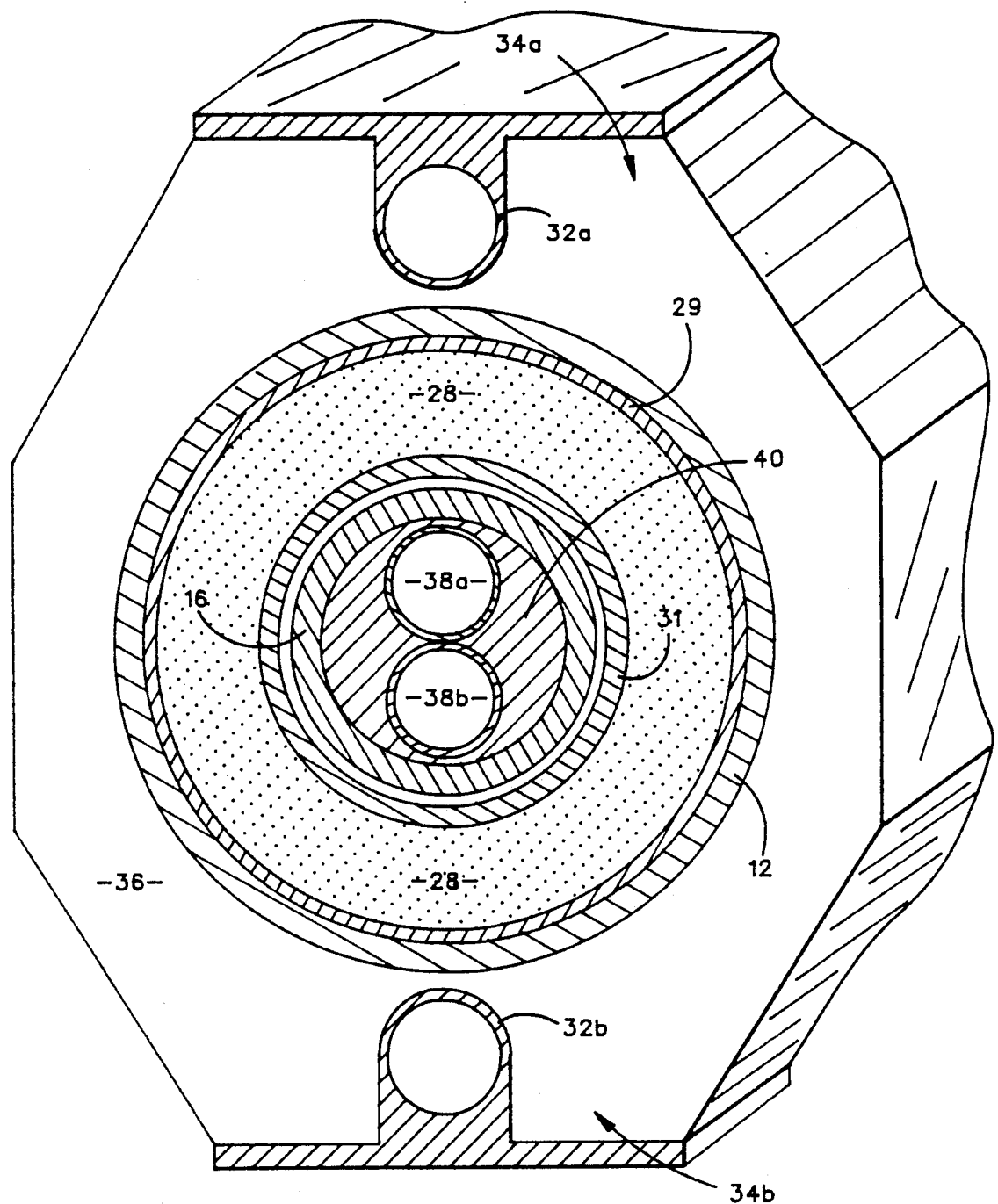
FIG. 3 is a sectional view of the magnetic rotary thermal joint of FIG. 1 taken along line 2—2.

FIG. 3 is a sectional view on FIG. 1 taken along line 2—2 showing the magnetic rotary thermal joint in a section passing through the center of permanent magnet 28. First rotor heat pipes 32a, 32b are shown embedded in top carrier 34a and bottom carrier 34b, respectively. Heat pipes of this type are available for companies such as Hughes Aircraft. El Segundo, Calif. and Grumman Aerospace Corp. of Bethpage, Long Island, N.Y. The top carrier 34a and bottom carrier 34b for the respective heat pipes are coupled both mechanically and thermally to the top and bottom of first rotor frame 36. Second rotor heat pipes 38a and 38b are shown press-fit into second rotor core 40 which in turn is press-fit into second rotor 16. The first rotor frame 36 is interposed between the first bearing means 20 and the second bearing means 22 and has a central bore for receiving a stacked column of axially aligned toroid pole pieces separated by toroidal permanent magnets 28.

Figure 4:
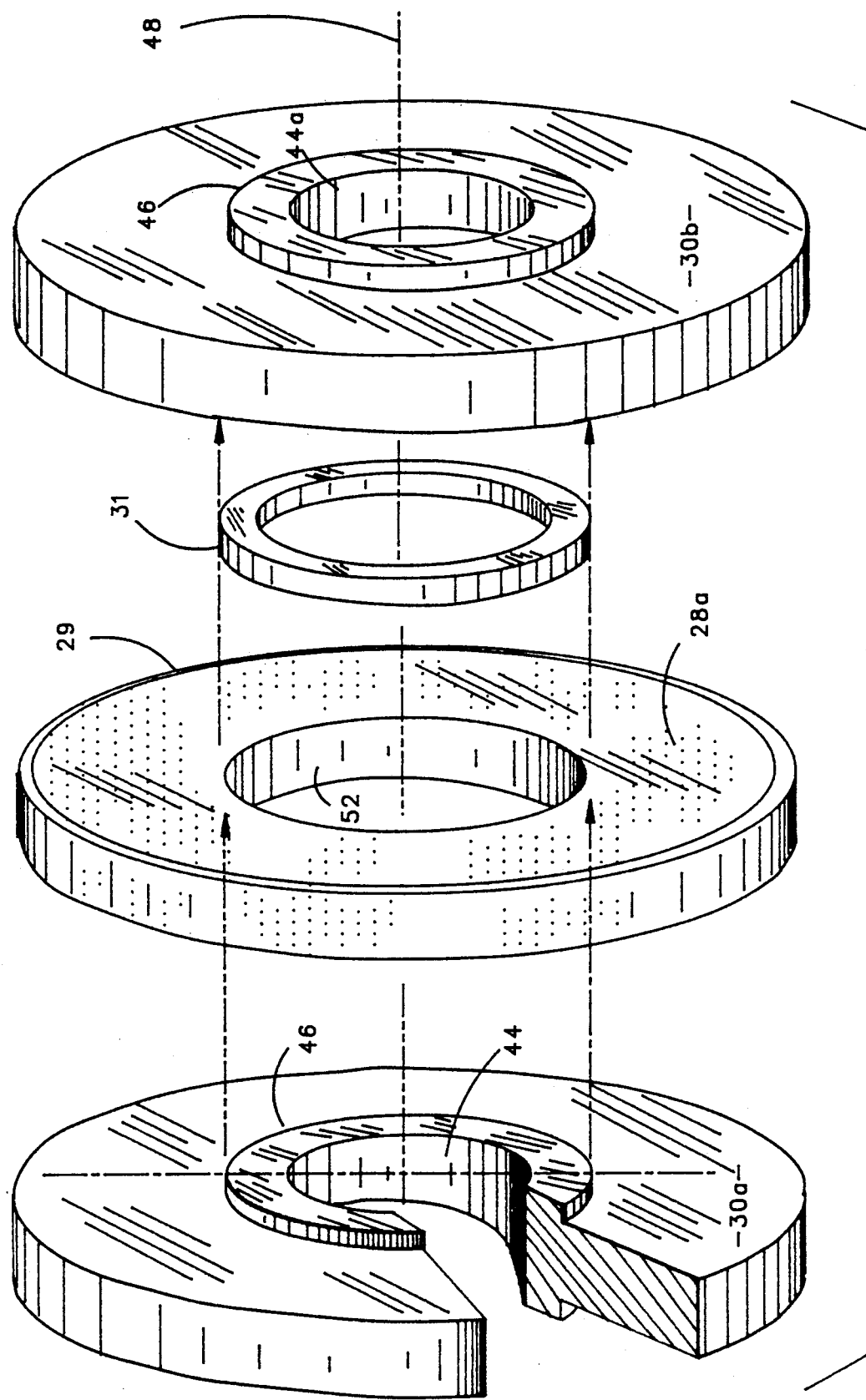
FIG. 4 is an exploded perspective view of a toroid magnet positioned between two pole pieces.

FIG. 4 depicts a toroidal permanent magnet 28a and adjacent toroidal pole pieces 30 and 30b. The toroidal pole pieces have a central bore 44 for receiving the diameter of the second rotor thermal surface with clearance for free rotation. A circular flange 46 surrounds the central bore 44. Toroidal pole piece 30b has a central bore 44a equal in diameter to that of central bore 44, both respective central bores 44, 44a being coaxial on rotational axis 48.

Permanent magnet 28a has a bore hole 50 for receiving the outer perimeter of right circular flange 46 on the right side of toroidal pole piece 30a in a left entry 52 and for receiving a left circular flange (not shown) on the left side of toroidal pole piece 30b in right entry 54. The permanent magnet 28 and pole pieces are stacked and inserted into the first rotor sleeve 12, which is in turn, inserted with an interference fit into rotor frame bore 16.

The outside diameter of the toroidal pole pieces are predetermined to match the inside diameter of the first rotor sleeve 12. The outside diameter of the permanent magnets is slightly smaller than the inside diameter of the first rotor sleeve 12. A brass sleeve 29 is inserted over the permanent magnet outside diameter to fill the void between the outside diameter of the permanent magnet and the inside diameter of the first rotor sleeve 12. In an alternative embodiment, the magnets are formed from a samarium cobalt material and are purchased with a brass ring pre-attached to the outer perimeter of each magnet to facilitate coupling the magnet to the inner wall of sleeve 12 by brazing or soldering. A brass ring 31 fills the void between the toroidal pole pieces 30 to avoid magnetic shorting between the pole pieces.

Figure 5:
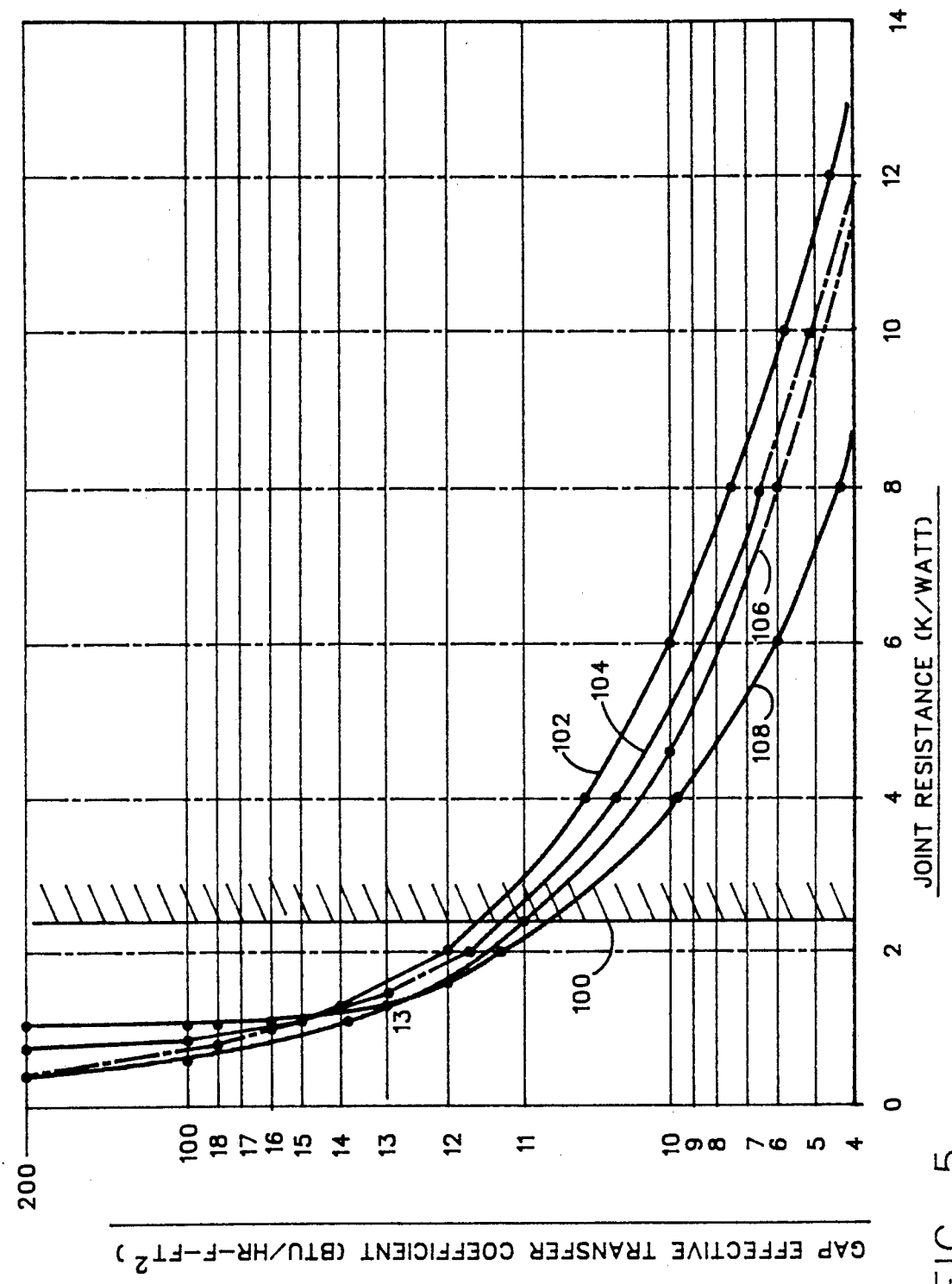
FIG. 5 is a graph of performance requirements for 5 alternative thermal joint arrangements.

FIG. 5 shows theoretical performance predictions for alternate geometric configurations. The curve numbers 102, 104, 106 and 108 correspond to the configurations depicted in FIGS. 6, 7, 8 and 10.

FIG. 9 is an end view of the cylindrical concept shown in the sectional view of FIG. 10. FIG. 10 is taken along section line 10—10 shown in FIG. 9.

Referring to FIG. 5, vertical line 100 shows the joint thermal resistance requirement as a single value on the horizontal axis. This is the value necessary to satisfy the heat transport requirements for a typical space surveillance tracking sensor. The vertical axis in FIG. 5 relates to the thermal efficiency of the gap and is characterized as the gap effective heat transfer coefficient. The value at which each curve crosses the vertical line 100 represents the minimum heat transfer coefficient necessary for each configuration (FIGS. 6 through 10) to satisfy the given heat transport requirement for the example sensor.

Mechanical and thermal tests were performed on a structure in accordance with FIG. 8, to obtain data for the gap thermal performance using a one-inch diameter flat surface rare earth (cobalt) magnet (Part No. 96C2173B) purchased from the PERMAG PACIFIC CORPORATION in Los Alamitos, Calif. The test setup included mechanical needle thrust bearings and a built-in micrometer adjustment for setting the gap spacing. With no fill material in the gap, the baseline torque measurement was 12-in-oz, with gap fill material in place, the torque was maintained at approximately 24-in-oz during test. Various fill materials, particle sizes and gap spacings were used over a temperature range between ambient (300K.) and below 100K. The tests were run in a vacuum chamber to simulate a deep space environment.

Table I summarizes the results of over 65 tests made with a variety of fill materials. The fill material, the particle size (mesh or micron diameter) and the gap size for each test group is shown. The fill powders were purchased from the ATLANTIC EQUIPMENT ENGINEERS in Bergenfield, N.J. as well as PERMAG PACIFIC CORPORATION. As can be seen in Table I, the best overall thermal results were obtained for materials with the smallest particle size. Almost all of the rare earth powders (Reference Nos. 7, 9, 12, 13, 14 and 15 in Table I) achieved thermal performance above that necessary to satisfy the requirements of FIG. 5 (multiply the Table I data by 1.9 for equivalent units).

TABLE 1

Magnetic Rotary Thermal Joint Test Summary

| REF. NO. | TEST GROUP | FILL MATERIAL/SIZE (GAP, IN.) | TEST HTC RANGE (W/K SQ. FT.) | HTC AVG VALUE (W/K SQ. FT.) | HTC RMS VALUE (W/K SQ. FT.) | HTC "BEST" DATA VALUE (W/K SQ. FT.)[1] |
|---|---|---|---|---|---|---|
| 1 | 2–4 | Incor 18/80 M (0.005) | 7.3–10.9 | 9.4 | 9.5 | 7.3 |
| 2 | 5–9 | Ferric Oxide/300 M (0.005) | 5.0–5.2 | 5.13 | 5.13 | 5.2 |
|   |   |   | 4.9–9.7 |   | 6.28 | 4.9 |
| 3 | 10 | Ferric Oxide/300 M (0.007) | 4.2 | — | — | 4.2[2] |
| 4 | 11–14 | Ferric Oxide/300 M (0.009) | 1.8 | 1.8 | 1.8 | 1.8 |
| 5 | 15–21 | Ferric Oxide/300 M with Kapton Shims (0.006)[3] | 6.7–11.7 | 9.45 | 9.67 | 6.7 |
| 6 | 35–40 | Ferric Oxide/300 M (0.007) | 3.1–7.5 | 5.8 | 6.06 | 7.3 |
| 7 | 44–47 | Cobalt/325 M Spherical (0.006) | 10.1–21.4 | 15.77 | 16.55 | 11.5 |
| 8 | 48–51 | Cobalt/200 M - 325 M (0.008) | 3.5–8.9 | 6.4 | 6.8 | 3.5 |
| 9 | 53 | Cobalt/325 M - 10μ (0.007) | 14.2 | — | — | 14.2[2] |
| 10 | 54 | Cobalt Coated Hollow C Sphere (006) | 2.6 | — | — | 2.6[2] |
| 11 | 55 | Cobalt/325 M - 10μ (0.01) | 3.9 | — | — | 3.9[2] |
| 12 | 56–58 | Cobalt/325 M - 10μ (0.005) | 10.9–12.4 | 11.37 | 11.39 | 10.9 |
| 13 | 59–63 | Cobalt/90% < 5μ (0.005) | 13.6–16.7 | 15.39 | 15.29 | 16.7 |
| 14 | 64–66 | Incor 24/74μ (0.005) | 9.7–11.6 | 10.73 | 10.76 | 10.9 |
| 15 | 67–68 | Incor 24/74μ Rubbed with Moly (0.0035)[4] | 8.2–9.4 | 8.8 | 8.82 | 9.4 |

HTC = Heat transfer coefficient.
NOTES:
[1] "Best" indicates data from the most stable, steady-state run nearest the example sensor operational temperature range
[2] This data is a single test for the given material and gap
[3] Conductive shim effects are excluded in evaluating $H_{eff}$
[4] Same material load as Ref. 14
[5] To convert to same units as FIG. 4, multiply the above HTC values by 1.9.

The performance of the invention Magnetic Rotary Thermal Joint can be made by using the embodiment depicted in FIG. 1 with the test results shown in Table 1. The embodiment of FIG. 1 represents a production type configuration based on the arrangement of FIGS. 9 and 10. Using the rotor area for surface 18 in Figure (approximately 25 square inches) the "best" data value from Ref. No. 13 (Table I) for the heat transfer coefficient across the gap and using a thermal load of approximately 8 watts, calculations can be performed showing a temperature gradient of less than 3 degrees can be obtained between the first rotor heat pipes (32a and 32b) and the second rotor heat pipes (38a and 38b). Performance can be achieved at cryogenic temperature below 100° K. across a continuously rotating interface with an estimated torque for the assembly of less than 150 in-oz.

The description provided is intended to be illustrative only and is not intended to be limitative. Those skilled in the art may conceive of modifications to the figure disclosed. However, any such modifications which fall within the purview of the description are intended to be included therein as well. The scope of this invention shall be determined from the scope of the following claims including their equivalents.

I claim:

1. A magnetic rotary thermal joint for use in low temperature vacuum environments comprising:
   a first rotor having a first thermal surface;
   a second rotor having a second thermal surface;
   bearing means for rotationally coupling said first rotor and said second rotor, each said rotor being free to rotate in fixed coaxial alignment with respect to the other rotor so that said first and second thermal surfaces face one another across a gap; and,
   thermally conductive magnetic powder filling said gap for providing a thermal path from said first thermal surface to said second thermal surface.

2. The magnetic thermal joint of claim 1 wherein said gap is a fixed predetermined gap.

3. The magnetic thermal joint of claim 2 additionally comprising:
   at least a first permanent magnet coupled to said first surface, said first magnetic providing a magnetic field across said gap, and a high permeability magnetic path for guiding lines of flux from said magnetic field across said gap.

4. The magnetic thermal joint of claim 3 wherein said thermally conductive ferromagnetic powder comprises:
   a ferromagnetic powder of high permeability and predetermined particle size filling said gap, the magnetic field of said magnet operating to align said particles in said magnetic field and to thermally coupled said first surface to said second surface via said ferromagnetic powder particles.

5. The magnetic thermal joint of claim 2, additionally comprising a magnet situated to impress a magnetic field across said gap.

6. The magnetic thermal joint of claim 5 wherein said thermally conductive ferromagnetic powder comprises a ferromagnetic powder of high permeability and predetermined particle size filling said gap, and wherein said magnetic field operates to hold said magnetic powder in said gap to provide thermal conduction between said first and second thermal surfaces.

7. A magnetic rotary thermal joint comprising:
   a first rotor comprising a housing having a central bore,
   at least a first pair of toroidal pole pieces having outside diameters characterized to match the inside diameter of said housing central bore, said pole pieces being inserted into said central bore, the outer diameter of said toroidal pole pieces being coupled to the inner wall of said housing central bore, each toroidal pole piece having a central bore,
   at least a first toroidal magnet having a first flat surface magnetized to have a first polarity and a second flat surface magnetized to have a second polarity, said first toroidal magnet being inserted in said housing central bore and coaxially aligned with and axially positioned between said first and second toroidal pole pieces, said toroidal magnet having a central bore, the central bores of said toroidal pole pieces and said toroidal magnet being coaxially aligned to form a first thermal surface, and
   a second rotor having a cylindrical surface for insertion into said toroidal pole piece central bore and said toroidal magnet central bore, said cylindrical surface forming a second thermal surface,
   said first and second rotors being coupled integrally to respective input and output reference frames,
   bearing means for rotationally coupling said first rotor to said second rotor, each said rotor being free to rotate in fixed coaxial alignment with respect to the other rotor with a fixed predetermined gap therebetween, said first and second thermal surfaces being separated by a fixed predetermined gap, and
   a thermally conductive ferromagnetic powder interposed in said gap between said first and second thermal surface.

8. The magnetic thermal joint of claim 7 wherein said first and second rotors further comprise:
   at least a first heat pipe for transferring heat to said first thermal surface.

9. The magnetic thermal joint of claim 7 wherein said first and second rotors further comprise:
   at least a first heat pipe for transferring heat to said first thermal surface, and a second heat pipe means for transferring heat from said second rotor.

10. The magnetic thermal joint of claim 7 wherein said thermally conductive ferromagnetic powder comprises:
    a ferromagnetic powder of high permeability and predetermined particle size filling said gap.

11. A magnetic rotary thermal joint comprising:
    a first rotor comprising a housing having a central bore,
    at least a first pair of cylindrical pole pieces having opposing sides and an outside diameters characterized to match the inside diameter of said housing central bore, said pole pieces being inserted into said central bore, the outer diameter of said toroidal pole pieces being coupled to the inner wall of said housing central bore, each toroidal pole piece having a central bore circled by a flange concentric with said toroidal pole piece central bore,
    at least a first toroidal magnet having a first flat surface magnetized to have a first polarity and a second flat surface magnetized to have a second polarity, said first toroidal magnet being inserted in said housing central bore and coaxially aligned with and axially positioned between said first and second toroidal pole pieces, said toroidal magnet having a central bore characterized to concentrically receive said toroidal pole piece flange, the central bores of said toroidal pole pieces and said toroidal magnet being coaxially aligned to form a cylindrical bore forming a first thermal surface, and a second rotor having a cylindrical surface for insertion into said cylindrical bore formed by said toroidal pole piece central bore and said toroidal magnet central bore, said second rotor cylindrical surface forming a second thermal surface, said first and second rotors being coupled integrally to respective input and output reference frames, bearing means for rotationally coupling said first rotor to said second rotor, each said rotor being free to rotate in fixed predetermined gap therebetween, said first and second thermal surfaces being separated by a fixed predetermined gap, and a thermally conductive ferromagnetic powder interposed in said gap between said first and second thermal surface.

12. The magnetic rotary thermal joint of claim 11, wherein said thermally conductive ferromagnetic media comprises a thermally conductive ferromagnetic powder of high permeability, and wherein said powder fills said gap.

13. A magnetic rotary thermal joint for use in deep space environments having a temperature of less than 100K., comprising:

a first rotor having a first thermal surface;

a second rotor, coaxially aligned with said first rotor and rotatable with respect to said first rotor, said second rotor having a second thermal surface facing said first thermal surface and separated from said first thermal surface by a gap;

a magnet for impressing a magnetic field across said gap; and a ferromagnetic powder filling said gap.

14. The magnetic rotary thermal joint of claim 13, wherein said ferromagnetic powder comprises thermally conductive ferromagnetic powder of high permeability and predetermined particle size filling said gap, and wherein said magnetic field operates to hold said magnetic powder in said gap to provide thermal conduction between said first and second thermal surfaces.

* * * * *